United States Patent

Rensin

[15] 3,678,507

[45] July 18, 1972

[54] CODE COMPRESSION SYSTEM

[72] Inventor: Ernest I. Rensin, Northridge, Calif.

[73] Assignee: International Telephone and Telegraph Corporation, New York, N.Y.

[22] Filed: Dec. 15, 1969

[21] Appl. No.: 885,087

[52] U.S. Cl. ....................................340/347 DD, 179/15.55
[51] Int. Cl. ...........................................G06f 5/00, G06f 5/06
[58] Field of Search ................................179/15.55; 340/347

[56] References Cited

UNITED STATES PATENTS

| | | | |
|---|---|---|---|
| 3,348,203 | 10/1967 | Allen | 179/15.55 |
| 3,327,062 | 6/1967 | Klund | 179/15.55 |
| 3,238,298 | 3/1966 | Willis | 179/15.55 |
| 3,093,796 | 6/1963 | Westerfield | 179/15.55 |

*Primary Examiner*—Maynard R. Wilbur
*Assistant Examiner*—Jeremiah Classman
*Attorney*—C. Cornell Remsen, Jr., Walter J. Baum, Paul W. Hemminger, Charles L. Johnson, Jr. and Thomas E. Kristofferson

[57] ABSTRACT

A code compression system whose output is an identical maximal length sequence code at a multiple of an input frequency code. A plurality of identical maximal length sequence codes are provided at a predetermined frequency which are delayed by fixed amounts with respect to each other. The codes are sampled at a rate higher than the frequency of the codes. The sampled codes are then combined to produce the output code at a multiple of the input frequency.

5 Claims, 2 Drawing Figures

INVENTOR.
ERNEST I. RENSIN
BY Harvey S. Getz
ATTORNEY

CODE COMPRESSION SYSTEM

This invention relates in general to a code compression system, and more particularly, to a system wherein a high frequency code is generated from a lower frequency code by high frequency sampling.

BACKGROUND OF THE INVENTION

The generation of a high frequency code directly from a clock frequency source has required the use of very fast exclusive OR binary adders and their associated delay times. As the requirement for still higher frequency codes came into existence, these codes could not be generated by state of the art coders directly.

In order to overcome the attendant disadvantages of prior art code compression systems, the present invention produces high frequency codes utilizing state of the art coders. Moreover, the system does not require very fast exclusive OR binary adders and their associated delay times. Further, the clock frequency for the higher frequency code is the same as that where a coder is used directly to generate a lower frequency code. Moreover, only two very fast gates and one fast simple flip-flop is required to generate a fast code regardless of the number of code stages or feedback connections.

The advantages of this invention, both as to its construction and mode of operation will be readily appreciated as the same become better understood by reference to the following detailed description when considered in connection with the accompanying drawing.

DESCRIPTION OF THE PREFERRED EMBODIMENT

In describing the apparatus of the present invention, a convention is employed wherein individual AND and OR gates are shown as semicircular blocks with the inputs applied to the straight side and the output appearing on the semicircular side. An AND gate is indicated by a (·) and an OR gate by a (+) in the semicircular block. In the present case an AND gate produces a "1" or information level output signal when every input differs from the "0" level and an OR gate produces a "1" or information level output signal when one or more inputs differ from the "0" level.

Figure 1:
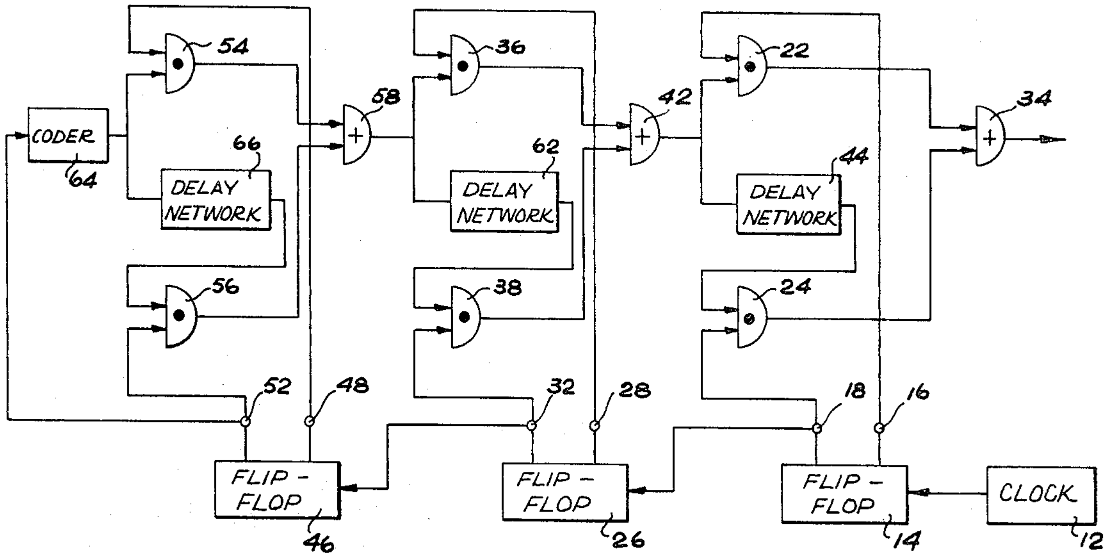
FIG. 1 illustrates a schematic block diagram of the apparatus of the present invention; and, FIG. 2 illustrates an example of waveforms employed in the apparatus of FIG. 1.

Referring now to FIG. 1 of the drawings, there is shown a schematic block diagram of a preferred embodiment of the apparatus of the present invention. The code compressor shown in FIG. 1 produces in three stages a resultant code of one eighth the original code period. However, it should be understood, of course, that other numbers of stages could be used with resultant differing compression possible.

In FIG. 1, a clock pulse generator 12 provides basic timing signals i.e., clock pulses which occur once during each bit interval of operation for controlling the overall operation of the apparatus of the present invention. The output signals from the clock pulse generator are coupled to the input terminal of a first flip-flop circuit 14 having a first output terminal 16 and a second output terminal 18. The output terminal 16 is connected to an input terminal of a first AND gate 22. The output terminal 18 is connected to both the input terminal of a second AND gate 24 and the input terminal of a second flip-flop circuit 26 having a pair of output terminals 28,32. The output terminals of the AND gates 22 and 24 are coupled to the input terminals of a first OR gate 34.

The output terminal 28 of the flip-flop circuit 26 is connected to an input terminal of a third AND gate 36. The output terminal 32 of the flip-flop circuit 26 is connected to an input terminal of a fourth AND gate 38. The output terminals of the AND gate 36 and 38 are connected to input terminals of an OR gate 42. The output terminal of the OR gate 42 is connected to an input terminal of the first AND gate 22 and through a delay network 44 to an input terminal of the AND gate 24.

The output terminal 32 of the flip-flop 26 is also connected to the input terminal of a third flip-flop 46, having a first output terminal 48 and a second output terminal 52. The first output terminal 48 is connected to an input terminal of the fifth AND gate 54. The output terminal 52 is connected to an input terminal of a sixth AND gate 56. The output terminals of AND gates 54 and 56 are connected to input terminals of an OR gate 58. The output terminal of OR gate 58 is connected to an input terminal of the AND gate 36 and also through a delay network 62 to an input terminal of the AND gate 38.

The output terminal 52 is also connected to the input terminal of a coder 64. The output terminal of the coder is connected to an input terminal of an AND gate 54 and also through a delay network 66 to an input terminal of the AND gate 56.

The coder 64 output is a linear maximal sequence. A linear maximal sequence is a binary sequence generated by a linear shift-register generator and which has the longest possible period for this generation method. This longest possible period is given by $$L = 2^n - 1$$

where $L$ = length of maximal length sequence; and $n$ = number of stages in the shift register generator.

It has been found that if two or more identical maximal length sequences delayed fixed amounts with respect to each other, are sampled at a rate higher than their frequency, the resultant will be an identical maximal length sequence at a multiple of the original frequency. For example, two maximal length codes at frequency $f_o$ displaced one-half word apart and sampled alternately at $2f_o$ will generate the same code at $2f_o$.

Figure 2:
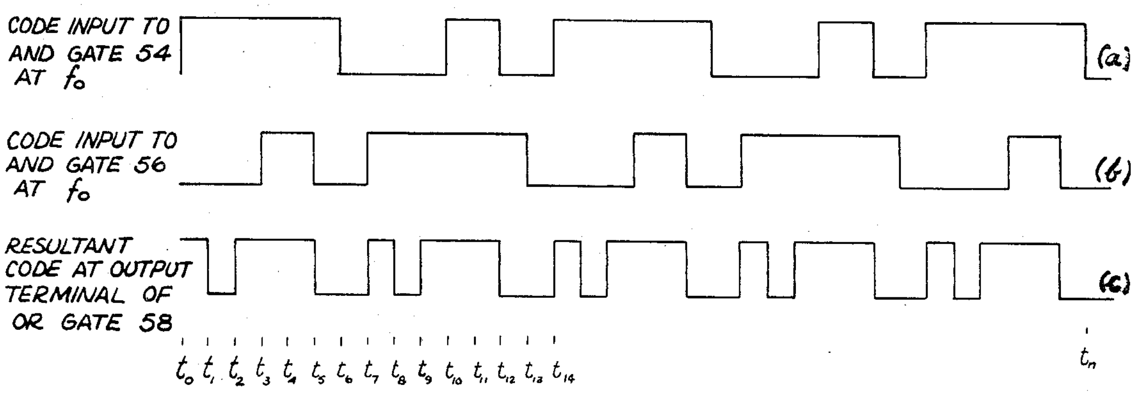

The clock 12 which operates at a frequency $f_o$ is divided down by the flip-flops 14, 26 and 48, so that the output of the flip-flop at terminal 52 which is coupled into the input of the coder 64, is $f_o/8$. The coder 64 is energized by the output signals at the terminal 52. It should be noted that it may be necessary to sharpen the input to the coder 64 such as differentiating or stretching in order to obtain a correct code trigger. The output of the coder, which is shown in FIG. 2 is a linear maximal length sequence and is coupled to both the AND gate 54 and through the delay network 66 to the AND gate 56. The delay network 44, 62 and network 66 are each designed so that they delay their inputs one-half word. Thus, as shown in FIGS. 2(*a*) and (*b*), the code word input to AND gate 54 from the coder 64 is delayed one-half word with respect to the code word input to the AND gate 56. The AND gates 54 and 56 also receive inputs from the terminals 48 and 52 of the flip-flop circuit 46. Thus, the AND gate 54 receives a "1" from the flip-flop 46 for a period of time during which the AND gate 56 receives an "0". During the period of time during which the AND gate 56 receives an "1", the AND gate 54 will receive a zero. Therefore, one of the inputs to the OR gate 58 will always be zero. Thus, OR gate 58 acts as a sampler passing the code of either the AND gate 54 or 56 which is receiving the "1" from the flip-flop 46.

Referring to FIG. 2, if at time $t_o$, the input to AND gate 54 is "1" then the input from coder 64 will appear at the output of OR gate 58. At time $t_l$, the input to AND gate 56 is "1" and the input from the delay network 66 to AND gate 56 will appear at the output of OR gate 58. Thus, the input to the AND gates 54 and 56 are alternately sampled and the resultant code at the output terminal of OR gate 58 results in a signal of twice the frequency at the input of the AND gates.

OR gates 58 and OR gate 42 serve the same function for the AND gates 36 and 38, and the AND gates 22 and 24, respectively, that the coder 64 serves for the AND gates 54 and 56. The operation of the AND gates 54 and 56 and OR gate 58 is typical of the operation of the other stages of the circuit.

The delay 62 for the AND gate 38 is set at a rate of one-half the delay of the network 66. As can be readily seen, the AND gates 36 and 38 are triggered by the flip-flop 26 at a rate of twice the frequency that the flip-flop 46 triggered the AND gates 54 and 56. The resultant code at the output of the OR gate 58 will be twice the clock frequency at the input 64. Further, the resultant code at the output of the OR gate 42 will be four times the clock frequency of the coder 64, and, of course, the resultant code at the output of the OR gate 34 would be at eight times the resultant code of the coder 64 with the delay at delay network 44 being one-fourth the delay of the delay network 66. The method thus far described is superior to generating the high frequency code directly in that it does not require the very fast exclusive OR binary adders and their associated delay times. The clock frequency for either case would be identical, but the present system requires only two very fast gates i.e., AND gates 22 and 24 and one fast simple flip-flop, i.e., flip-flop 14 to generate a fast code regardless of the number of code stages or feedback connections.

Alternate methods of compressing the code by multiplication of higher order than two are possible. As has been shown, doubling the code repetition rate requires two codes delayed by one-half word. Higher order multiplication of order K requires K number of codes spaced consecutively a predictable number of bits apart. For $K = 2^p$ where $p$ is an integer, all codes are identical. When $K$ is odd or an even multiple of an odd number such as 3 (odd) or 6 (even multiple of odd) the codes must be a set of the inverse of the output desired code. For instance, for $K = 3$, three inverse codes are used spaced one-third word apart from each other. It should be noted that $K$ may not assume any value which is a factor of the number of bits per word. Thus, for a four bit register with 15 bits per word direct multiplication by 3, 5 or 15 is not possible. Examples of $K = 2^p$ are given below:

For direct multiplication by four, four codes of clock rate $f_0$ delayed three-fourths of a word and sampled at $4f_0$ will give an identical code at a clock rate of $4f_0$. For a direct multiplication by eight, eight codes at clock rate $f_0$ delayed consecutively by seven-eighths of a word and sampled at 8 times $f_0$ give an $8f_0$ code. From the point of view of using a minimum number of components the cascaded "times two" system as exemplified in FIGS. 1 and 2, for example three stages, to generate an $8f_0$ code is preferable to the direct multiplication system.

What is claimed is:

1. A code compression system comprising:

means for producing a plurality of identical maximal length sequence codes at a predetermined frequency delayed by fixed amounts with respect to each other comprising a linear shift-register and which has the longest possible period for this generation method and wherein the longest possible period is given by $$L = 2^n - 1$$

where $L$ = the length of the maximal length sequence; and $n$ = the number of stages in said shift register;

means for sampling said codes at a rate higher than the frequency of said codes and producing sampled output signals; and means for combining said sampled output signals and producing an identical maximal length sequence code at a multiple of said predetermined frequency.

2. A code compression system in accordance with claim 1 wherein said means for sampling said codes at a rate higher than the frequency of said codes includes a flip-flop circuit having a first output terminal and a second output terminal, a first AND gate and a second AND gate each having a pair of input terminals and an output terminal, and wherein one of said flip-flop circuit output terminals is coupled to one of said input terminals of said first AND gate and the other of said flip-flop output terminals is coupled to one of said input terminals of said second AND gate, and wherein one of said codes is coupled to the other of said first AND gate input terminals and another of said codes is coupled to the other of said second AND gate input terminals.

3. A code compression system in accordance with claim 2 wherein said means for combining said sampled output signals comprises an OR gate having a pair of input terminals, each of said AND gate output terminals being coupled to one of said OR gate input terminals, respectively.

4. A code compression system in accordance with claim 1 wherein said identical maximal length sequence code produced has a code repetition rate double the frequency of the input code frequency and wherein said delayed identical maximal length sequence codes are delayed by one-half code word.

5. The method of generating a maximal length sequence code at a higher multiple of a predetermined frequency comprising the steps of:

a. generating a plurality of said maximal length codes;

b. delaying said codes by fixed amounts with respect to each other;

c. sampling said codes at a rate higher than the frequency of said codes; and d. combining said sampled codes.

* * * * *